United States Patent
Gugger et al.

(10) Patent No.: US 12,102,109 B2
(45) Date of Patent: Oct. 1, 2024

(54) OAT-BASED PEANUT BUTTER-FLAVORED COMPOSITIONS AND METHODS

(71) Applicant: General Mills, Inc., Minneapolis, MN (US)

(72) Inventors: Eric T Gugger, Plymouth, MN (US); Pete Galuska, Hudson, WI (US)

(73) Assignee: General Mills, Inc., Minneapolis, MN (US)

( * ) Notice: Subject to any disclaimer, the term of this patent is extended or adjusted under 35 U.S.C. 154(b) by 639 days.

(21) Appl. No.: 16/755,429

(22) PCT Filed: Oct. 13, 2017

(86) PCT No.: PCT/US2017/056572
§ 371 (c)(1),
(2) Date: Apr. 10, 2020

(87) PCT Pub. No.: WO2019/074520
PCT Pub. Date: Apr. 18, 2019

(65) Prior Publication Data
US 2020/0260765 A1  Aug. 20, 2020

(51) Int. Cl.
*A23L 7/10* (2016.01)
*A23D 7/005* (2006.01)
*A23L 7/126* (2016.01)
*A23L 7/139* (2016.01)
*A23L 7/196* (2016.01)

(52) U.S. Cl.
CPC .......... *A23L 7/1975* (2016.08); *A23D 7/0056* (2013.01); *A23L 7/126* (2016.08); *A23L 7/139* (2016.08); *A23L 7/196* (2016.08)

(58) Field of Classification Search
CPC .................................................... A23D 7/0056
See application file for complete search history.

(56) References Cited

U.S. PATENT DOCUMENTS 3,640,728 A * 2/1972 Ronai ...................... A23L 7/139
                                                       426/619
4,413,018 A   11/1983 Webster
(Continued)

FOREIGN PATENT DOCUMENTS

| AU | 685640 | 1/1998 |
| EP | 0937411 | 11/2004 |
| WO | WO 2008/009061 | 1/2008 |

OTHER PUBLICATIONS

Yan, The Cause of Bitter Flavour Development in Toasted Rolled Oats (*Avena sativa* L.) http://orapp.aut.ac.nz/bitstream/handle/10292/741/YanR.pdf?sequence=4&isAllowed=y (Year: 2007).*

(Continued)

*Primary Examiner* — Erik Kashnikow
*Assistant Examiner* — Lela S. Davis
(74) *Attorney, Agent, or Firm* — Rachel A. Kahler

(57) ABSTRACT

The present disclosure relates to oat-based peanut butter-flavored compositions and methods of making such compositions. In particular, a method is disclosed of roasting substantially intact groats until CIELAB L*-value change per minute, and CIELAB b*-value change per minute achieve a negative slope to produce roasted oats having a peanut butter flavor. Compositions including roasted oats having a peanut butter flavor are also disclosed.

10 Claims, 4 Drawing Sheets

(56) References Cited

U.S. PATENT DOCUMENTS 5,523,109 A 6/1996 Hellweg et al.
8,541,044 B1 9/2013 Johnson et al.

OTHER PUBLICATIONS

Marttila et al. Flavor and Texture in Processing of New Oat Foods (https://www.cerealsgrains.org/publications/plexus/cfwplexus/Documents/2013/OatsChemCh16.pdf) (Year: 2013).*
California Cereal Products, retrieved from the Internet, http://californiacereal.com/product-details/, Mar. 2015.

* cited by examiner

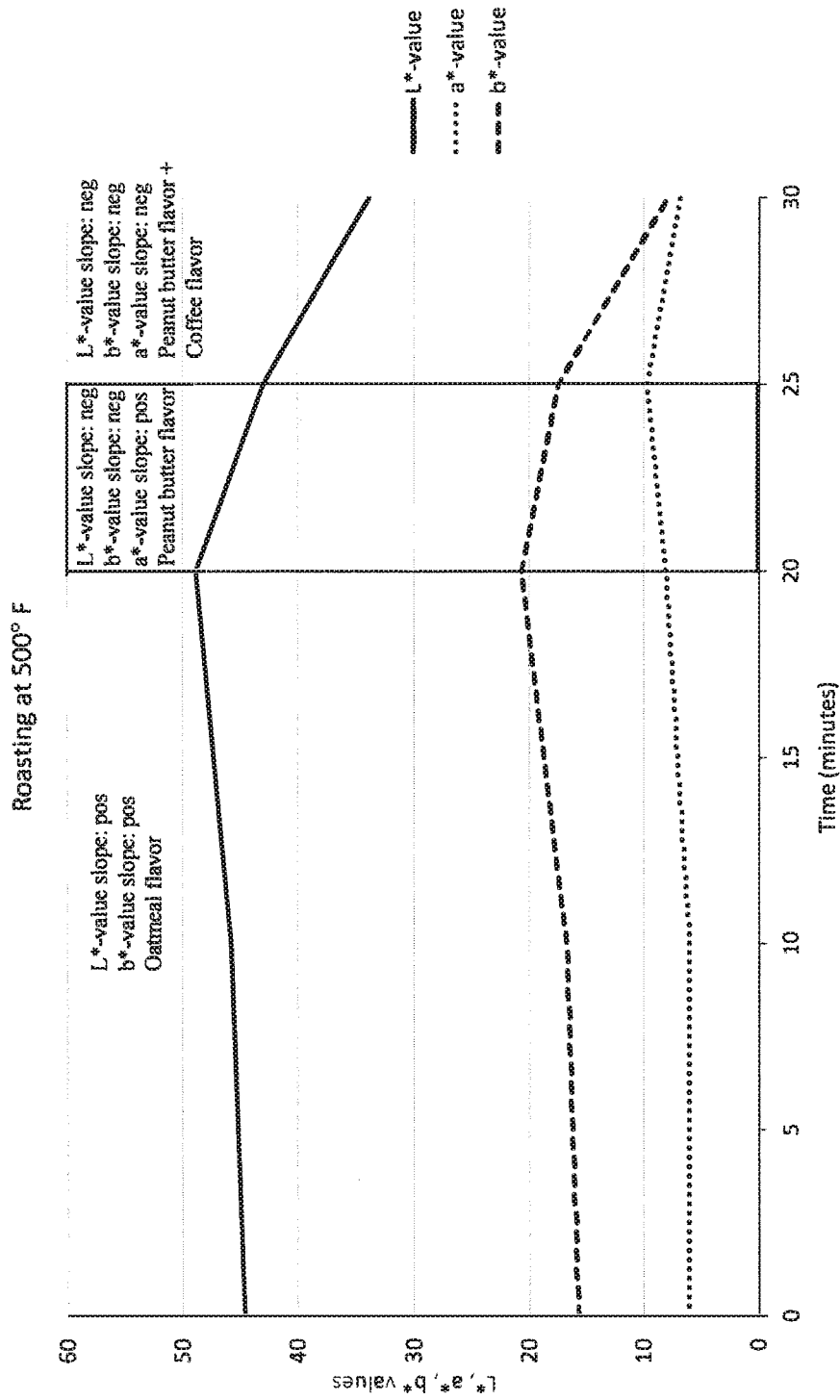

OAT-BASED PEANUT BUTTER-FLAVORED COMPOSITIONS AND METHODS

CROSS-REFERENCE TO RELATED APPLICATIONS

This application represents a National Stage application of PCT/US2017/056572, filed Oct. 13, 2017 and titled "Method of Producing Roasted Oats and Roasted Oat-Based Peanut Butter-Flavored Compositions". The entire content of this application is incorporated by reference.

TECHNOLOGY

The present disclosure generally relates to oat-based peanut-flavored compositions and methods for producing a peanut-flavored composition.

BACKGROUND

Peanut butter is a food product made from a paste including ground roasted peanuts. Peanut butter is often used as a spread or filling, or in other foods as a flavorant. Many consumers enjoy the distinctive flavor of peanut butter, which is derived from roasted peanuts, as well as its texture. However, some consumers are allergic to peanuts, so they cannot eat peanut butter. Although peanuts are not true nuts—they are legumes—they contain proteins that have similar structure to tree nuts, so people that are allergic to peanuts are sometimes also allergic to tree nuts, such as almonds and cashews. Therefore, some consumers prefer to use peanut butter substitutes that are not made from peanuts or tree nuts. Some peanut butter substitutes include pastes (or "butters") that resemble peanut butter made from other plant seeds, such as sunflower seeds, soybeans, pumpkin seeds, sesame seeds, and peas. Unfortunately, such peanut butter substitutes do not taste like peanut butter. Thus, there is a need for food compositions that provide a peanut butter-like flavor without requiring peanut or tree nut ingredients.

SUMMARY

A method of producing roasted oats is provided herein. The method includes roasting a plurality of substantially intact groats at a temperature of more than 300° F. for sufficient time to achieve a negative slope in CIELAB L*-value change per minute, and a negative slope in CIELAB b*-value change minute, where slopes for L*-value change per minute and b*-value change per minute are based on CIELAB measurements at intervals of 5 minutes.

In some embodiments, a method of producing roasted oats provided herein can also include roasting a plurality of substantially intact groats at a temperature of more than 300° F. for sufficient time to achieve a negative slope in CIELAB L*-value change per minute, a negative slope in CIELAB b*-value change minute, and a positive slope in CIELAB a*-value change per minute, where slopes are based on CIELAB measurements at intervals of 5 minutes.

In some embodiments, a method of producing roasted oats provided herein includes roasting the substantially intact groats at a temperature of at least 350° F. for at least 15 minutes.

In some embodiments, a method of producing roasted oats provided herein can include a step of inactivating lipase activity in the plurality of substantially intact groats prior to roasting. In some embodiments, the inactivating step includes exposing the plurality of substantially intact groats to steam for sufficient time to inactivate lipase activity. In some embodiments, the inactivating step includes soaking the plurality of substantially intact groats in water or an aqueous solution at a temperature and pressure sufficient to inactivate lipase activity.

In some embodiments, a method of producing roasted oats provided herein can include a step of drying the plurality of substantially intact groats to a moisture content of less than 15% after a lipase inactivation step and prior to roasting.

In some embodiments, a method of producing roasted oats provided herein can include storing the plurality of substantially intact groats following a drying step and prior to roasting.

In some embodiments, a method of producing roasted oats can result in roasted oats that have a moisture content of 6% or less, or a moisture content of 1% or less.

A food ingredient is provided herein. A food ingredient includes a whole, cut, or ground oat ingredient that has a peanut butter flavor. A food ingredient provided herein can be derived from roasted oats produced using a method of producing roasted oats provided herein.

In some embodiments, a food ingredient provided herein can be a flour derived from roasted oats produced using a method of producing roasted oats provided herein. In some embodiments, a food ingredient provided herein can include a flour derived from roasted oats produced using a method of producing roasted oats provided herein and a second flour. In some embodiments, a second flour can be derived from unroasted oats.

In some embodiments, a flour derived from roasted oats produced using a method of producing roasted oats provided herein can have at least 60% of flour particles passing through a 200 mesh (74 μm) screen. In some embodiments, a flour derived from roasted oats produced using a method of producing roasted oats provided herein can have at least 60% of flour particles passing through a 200 mesh (74 μm) screen.

In some embodiments, a food ingredient provided herein can have a shelf life at room temperature of at least 6 months.

A food product is provided herein. A food product includes a sufficient amount of a food ingredient provided herein to provide a detectable peanut butter flavor to the food product. In some embodiments, a food product provided herein can include an oil.

In some embodiments, a food product provided herein can be a spread or a snack bar. In some embodiments, a food product provided herein can be a pet food.

In some embodiments, a food product provided herein can be peanut-free.

In some embodiments, a food product provided herein can include flour, where the flour includes 15% to 50% flour derived from roasted oats produced using a method of producing roasted oats provided herein, and 50% to 85% flour derived from unroasted oats.

In some embodiments, a food product provided herein can be a peanut free spread.

These and various other features and advantages will be apparent from a reading of the following detailed description.

BRIEF DESCRIPTION OF THE DRAWINGS

FIG. 4 shows a graph of an example of CIELAB L*-value change, CIELAB b*-value change, and CIELAB a*-value change over time during roasting of oats at 500° F.

DETAILED DESCRIPTION

Figure 1:
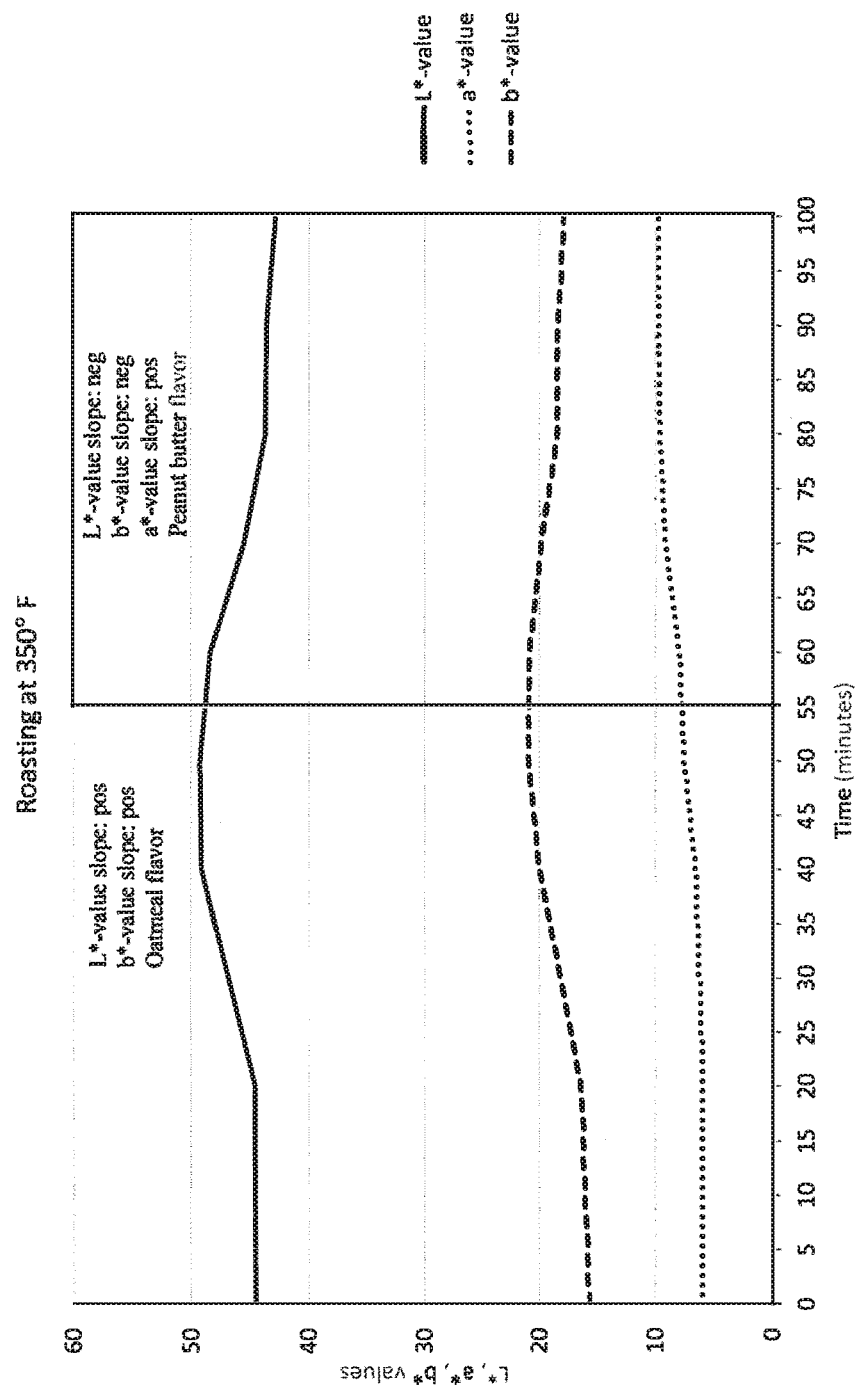
FIG. 1 shows a graph of an example of CIELAB L*-value change, CIELAB b*-value change, and CIELAB a*-value change over time during roasting of oats at 350° F.

Roasted peanuts and peanut butter have a distinctive flavor. While peanut butter flavor is widely enjoyed by consumers, peanuts are an allergen for a portion of the population. In addition, peanut butter is an expensive ingredient in foods that benefit from the flavor of peanut butter. Further, tree nut-based substitutes for peanut butter are also allergens and are often as expensive or more expensive than peanut butter. Unfortunately, peanut butter substitutes that are not tree nut-based lack the desired flavor of peanut butter.

As described herein, it has been discovered that oats that have been particularly roasted provide a peanut butter flavor. As used herein, the term "peanut butter flavor" refers to a flavor resembling the distinct flavor of dry roasted peanuts or peanut butter made from dry roasted peanuts. Peanut butter flavor is distinguishable from the flavor of tree nuts, or a generic "nutty flavor" used to describe roasted grains or seeds other than dry roasted peanuts. Although peanut butter flavor in peanut butter can be correlated to the presence of particular volatile compounds, peanut butter flavor from roasted oats provided herein may or may not be correlated with the same volatile compounds. For example, desirable flavor in peanut butter can be correlated to benzeneacetaldehyde content in dry roasted peanuts used to make the peanut butter. However, it is not necessarily the case that a roasted oat having a peanut butter flavor or a composition containing a roasted oat having a peanut butter flavor provided herein includes any particular level of benzeneacetaldehyde.

Provided herein are roasted oats having a peanut butter flavor. A method of producing roasted oats provided herein includes roasting substantially intact groats at a temperature of more than 300° F. (e.g., at least about 350° F., from about 350° F. to about 600° F., or about 375° F. to about 550° F.) for sufficient time for the groats to develop a peanut butter flavor, in order to produce the roasted oats. Peanut butter flavor in a roasted oat can be assessed by smelling and tasting whole roasted oats. In some embodiments, peanut butter flavor in a roasted oat can be assessed by grinding the roasted oat into a flour, and combining the flour with an oil, then tasting to determine the presence of a peanut butter flavor. It is to be understood that the described method of assessing peanut butter flavor is intended only to describe a convenient way to easily detect peanut butter flavor, and does not mean that roasted oats provided herein that are prepared in other ways do not have peanut butter flavor.

Roasting of substantially intact groats causes color change in the groats that can be observed by measuring changes in CIELAB values in the substantially intact groats as they roast. As used herein CIELAB (also termed CIE L*a*b*) values refers to a set of three color value coordinates, CIELAB L*-value, CIELAB a*-value, and CIELAB b*-value. As used herein, CIELAB measurement is performed by placing a sample (i.e., substantially intact groats) in a container and obtaining a CIELAB L*-value, CIELAB a*-value, and CIELAB b*-value using a Minolta Chroma Meter CR-410. "CIELAB L*-value" refers to lightness or darkness of color in a sample. A higher CIELAB L*-value reflects a lighter color, while a lower CIELAB L*-value reflects a darker color. For example, a sample with a CIELAB L*-value of 50 would appear lighter in color than a sample with a CIELAB L*-value of 0, which would appear black. "CIELAB a*-value" refers to the level of red/magenta or green color present in a sample. The lower the CIELAB a*-value, the more green the color. Conversely, the higher the CIELAB a*-value, the more red/magenta the color. For example, a sample with a negative CIELAB a*-value would appear greener than a sample with a positive CIELAB a*-value, which would appear redder. "CIELAB b*-value" refers to the level of yellow or blue color present in a sample. The lower the CIELAB b*-value, the more blue the color. Conversely, the higher the CIELAB b*-value, the more yellow the color. For example, a sample with a negative CIELAB b*-value would appear bluer than a sample with a positive CIELAB b*-value, which would appear yellower.

CIELAB values can be measured at various time points to assess rates of changes in CIELAB values over time during roasting. CIELAB values can be measured at any time interval, starting from time 0 (just prior to roasting; to) to assess changes in CIELAB values over time, with intervals of 5 minutes being preferred. For example, CIELAB values can be measured at $t_0$, $t_5$ (5 minutes of roast time), $t_{10}$ (10 minutes of roast time), $t_{15}$ (15 minutes of roast time), $t_{20}$ (20 minutes of roast time), $t_2$ (25 minutes of roast time), and the like. A slope for CIELAB value change over time can be determined for each CIELAB value and each time interval by calculating the difference between two consecutive measurements and dividing by the time interval in minutes. For example, the slope of CIELAB L*-value change between $t_{25}$ and $t_{20}$ is (CIELAB L*-value at $t_{25}$ minus CIELAB L*-value at $t_{20}$)/5 minutes.

Conveniently, development of peanut butter flavor in substantially intact groats as they roast can be correlated to achievement of a negative slope in CIELAB L*-value change per minute, and a negative slope in CIELAB b*-value change per minute, when CIELAB L*-values and CIELAB b*-values are measured at 5 minute intervals. Achievement of a negative slope in CIELAB L*-value change per minute or CIELAB b*-value change per minute for a given roasting time ($t_n$) is determined by calculating the slope between CIELAB L*-value or CIELAB b*-value at $t_n$ and the subsequent 5-minute time interval measurement of CIELAB L*-value or CIELAB b*-value ($t_{n+5}$), respectively, and determining that the change in CIELAB L*-value or CIELAB b*-value, respectively, has a negative slope. If one or both of the slopes between to and $t_{n+5}$ for CIELAB L*-value change per minute and CIELAB b*-value change per minute is positive, peanut butter flavor is generally not detectable at $t_n$. For example, in a sample that has been roasted for 15 minutes, and has CIELAB L*-values and CIELAB b*-values as shown in Table 1, where CIELAB L*-value change slope is negative, but CIELAB b*-value change slope is positive, peanut butter flavor is generally not detectable at 15 minutes.

TABLE 1

| Time (minutes) | CIELAB L*-value | CIELAB b*-value |
|---|---|---|
| 15 | 46.2 | 20.8 |
| 20 | 44.7 | 21.2 |
| Slope (change per minute) | −0.3 | 0.08 |

However, in a sample that has been roasted for 20 minutes, and has CIELAB L*-values and CIELAB b*-values as shown in Table 2, where both CIELAB L*-value change per minute slope and CIELAB b*-value change slope are negative, peanut butter flavor is generally detectable at 20 minutes.

TABLE 2

| Time (minutes) | CIELAB L*-value | CIELAB b*-value |
|---|---|---|
| 20 | 44.7 | 21.2 |
| 25 | 44.1 | 20.0 |
| Slope (change per minute) | −0.12 | −0.22 |

In some embodiments, peanut butter flavor in substantially intact groats can be correlated to achievement of a negative slope in both CIELAB L*-value change per minute and CIELAB b*-value change per minute, as well as achievement of a positive slope in CIELAB a*-value change per minute, as measured at 5 minute intervals. Achievement of a positive slope in CIELAB a*-value change per minute for a given roasting time ($t_n$) is determined by calculating the slope between CIELAB a*-value at $t_n$ and the subsequent 5-minute time interval measurement of CIELAB a*-value ($t_{n+5}$), and determining that the slope is positive.

In some embodiments, oats that have been roasted for a time sufficient to achieve a negative slope in all three of CIELAB L*-value change per minute, CIELAB b*-value change per minute, CIELAB a*-value change per minute, as measured at 5 minute intervals, can be associated with a reduced peanut butter flavor and an increase in a flavor similar to coffee.

FIGS. 1-4 illustrate examples of CIELAB L*-values, CIELAB b*-values, and CIELAB a*-values graphed as a function of roasting time. Roasting times that are identified as providing a peanut butter flavor to substantially intact groats are identified based on slopes of CIELAB L*-value change per minute and CIELAB b*-value change per minute. Roasting times that are identified as providing peanut butter flavor with coffee flavor notes to substantially intact groats are identified based on slopes of CIELAB L*-value change per minute, CIELAB b*-value change per minute, and CIELAB a*value-change per minute.

Roasting can be performed at any combination of temperature over 300° F. and time sufficient achieve a negative slope in CIELAB L*-value change per minute, and a negative slope in CIELAB b*-value change per minute, where slope is based on CIELAB measurements at intervals of 5 minutes. Generally, roasting is performed for at least 10 minutes (e.g., from about 15 minutes to about 2 hours, from about 15 minutes to about 120 minutes, or from about 20 minutes to about 75 minutes). For example, roasting time can be from about 20 minutes to about 90 minutes (e.g., about 30 minutes to about 75 minutes) at about 400° F. In another example, roasting time can be from about 10 minutes to about 30 minutes (e.g., from about 15 minutes to about 25 minutes) at 500° F. In yet another example, roasting time can be from about 45 minutes to about 2 hours (e.g., from about 55 minutes to about 120 minutes) at 350° F.

It is to be understood that roasting temperature need not be maintained at any single temperature so long as the combination of time and roasting temperature is sufficient to achieve a negative slope in CIELAB L*-value change per minute, and a negative slope in CIELAB b*-value change per minute, where slope is based on CIELAB measurements at intervals of 5 minutes. For example, substantially intact groats can be roasted for a period of time at 350° F. and then roasted for an additional period of time at 500° F., so long as the desired slopes for L*-value change per minute, b*-value change per minute, and/or a*-value change per minute are achieved.

Roasting can be performed using any appropriate equipment. For example, roasting can be performed using an oven, a fluidized bed dryer, or other equipment suitable for heating substantially intact groats to a temperature above 300° F. for sufficient time to achieve the desired slopes for L*-value, b*-value, and/or a*-value change per minute. In some embodiments, roasting is performed to reduce moisture content in substantially intact groats during roasting quickly. In some embodiments, humidity during roasting can be controlled to slow drying of the substantially intact groats during roasting. In some embodiments, substantially intact groats can be roasted to product roasted oats having a moisture content of less than 6% (e.g., less than 4%, less than 1%, or less than 0.5%).

As used herein, the term "substantially intact" refers to groats that have not been processed to result in cut, rolled, cracked, or broken groats. Although some groats may be damaged, at least 90% (e.g., at least 95%, or at least 98%) of the groats are intact, without obvious defects in the bran that expose the endosperm and/or germ. As used herein, the term "groat" refers to an oat grain exclusive of the hull.

Groats that are not substantially intact during roasting, such as rolled oats or cut oats, do not exhibit a peanut butter flavor. Instead, groats that are not substantially intact during roasting exhibit a bland flavor, more similar to toasted bread or oatmeal. Without being bound to theory, it is believed that either compound(s) that impart peanut butter flavor are not produced in groats that are not substantially intact during roasting, or that compound(s) that impart peanut butter flavor are degraded or volatilized. Oats suitable for methods provided herein include any available oat. Particularly suitable are oats of the species *Avena sativa*, *Avena nuda*, and *Avena byzantine*, and subspecies or varieties thereof. It is noted that non-oat grains, including wheat and barley, do not produce a peanut butter flavor when roasted. Instead, wheat and barley produce a flavor similar to toasted bread.

In some embodiments, soaking or steaming substantially intact groats in water or an aqueous solution prior to roasting can enhance peanut butter flavor. Presoaked or steamed groats can be roasted immediately, or dried and/or stored prior to roasting.

In some embodiments, substantially intact groats can be treated with conditions that inactivates lipase activity prior to roasting. For example, in some embodiments, substantially intact groats can be exposed to steam for sufficient time to inactivate lipase activity. In another embodiment, substantially intact groats can be soaked in water or an aqueous solution at a pressure of about 23 psi and about 250° F. to about 270° F. for about 20 minutes to about an hour to inactivate lipase activity. In another example, substantially intact groats can be soaked in water or an aqueous solution at a pressure of about 11 psi and about 235° F. to about 245° F. for about 30 minutes to about an hour to inactivate lipase activity. Substantially intact groats having inactivated lipase activity can have reduced oil rancidity and/or an increased shelf life following roasting (e.g., at least 6 months, at least 9 months, or at least 12 months). As used herein, lipase activity is measured by Oatcheck I colorimetric test (LSB Products, Manhattan, Kansas, USA) according to the manufacturer's instructions. Lipase activity in a sample tested using Oatcheck I produces a blue color after 30 minutes. Absence of blue color after 30 minutes indicates lipase activity inactivation.

In some embodiments, a step of drying groats can be performed prior to roasting. A drying step can reduce the moisture content of groats to a moisture content of less than 15% (e.g., less than 12%, less than 8%, or less than 4%). Any appropriate drying method, time, and temperature can be used. For example, substantially intact groats can be air dried at ambient temperatures to reach a moisture content of less than 15%. In another example, groats can be dried in an oven at an elevated temperature (e.g., from about 90° F. to about 300° F., about 100° F. to about 275° F., or from about 150° F. to about 250° F.). A moisture content of less than 15% can increase efficiency of roasting the substantially intact groats. In some embodiments, substantially intact groats can be dried to a moisture content suitable for storage (e.g., less than about 8%, or less than about 6%) before roasting. In some embodiments, dried groats can be stored for several hours to several months (e.g., 1 day to 6 months, 1 week to 3 months, and the like) before roasting. In some embodiments, a drying step can be performed after inactivating lipase activity and before roasting.

Roasted oats provided herein can be included in a food ingredient. Roasted oats can be used without further processing, or can be cut, rolled, ground, or otherwise processed before being included in a food ingredient. In some embodiments, a food ingredient provided herein can include an oat flour derived from roasted oats provided herein.

In some embodiments, an oat flour derived from a roasted oat provided herein can be relatively finely ground, such that at least 60% of the flour particles pass through No. 200 mesh (74 μm), or at least 60% of the flour particles pass through No. 325 mesh (44 μm).

An ingredient derived from roasted oats provided herein can be used alone or combined with other ingredients in an amount sufficient to produce a food product (e.g., a spread, a snack or breakfast bar, a dairy product such as ice cream, a dairy substitute such as oat milk, a sandwich snack, a frosting, a confectionary coating, or the like) having a detectable peanut flavor. In some embodiments, an ingredient derived from roasted oats provided herein can be included in peanut butter to reduce the ingredient cost of the peanut butter. In some embodiments, an ingredient derived from roasted oats provided herein can be included in a peanut butter substitute, such as a sunflower seed butter or pumpkin seed butter, to provide a peanut butter flavor.

In some embodiments, a food spread can be produced by blending a flour derived from roasted oats provided herein in an amount of from about 15% to about 50% (e.g., about 20% to about 40%, or about 25% to about 35%) with a flour derived from an unroasted seed or grain (e.g., oats, wheat, barley, sunflower, and the like, or combinations thereof) in an amount of from about 50% to about 85% (e.g., from about 60% to about 80%, or about 65% to about 75%) to produce a blended flour. The blended flour can then be combined with a liquid oil and/or a solid fat (e.g., canola oil, soy oil, coconut oil, palm oil, modified or fractionated fats or oils, and the like, or combinations thereof) to produce a spread (also termed "oat butter" herein) resembling peanut butter in taste and texture, without requiring peanuts. In some embodiments, additional ingredients can be added to an oat butter provided herein to modify texture, nutritional content, shelf life, and/or flavor. For example, a protein source (e.g., a protein concentrate or isolate, such as whey, soy, or the like) can be added to increase protein content, sugar and/or salt can be added to provide additional flavor, and/or antioxidants (e.g., vitamin E) can be added to increase shelf life.

In some embodiments, one or both of the flours in the blended flour used in an oat butter provided herein can be relatively finely ground, such that at least 60% of the flour particles pass through No. 200 mesh (74 μm), or at least 60% of the flour particles pass through No. 325 mesh (44 μm). The amount of each flour in a blended flour used in an oat butter having a peanut butter flavor provided herein can be adjusted to affect texture, flavor, and/or shelf life. Increasing amounts of a flour derived from roasted oats provided herein can increase peanut butter flavor, and increase stickiness, while increasing amounts of flour derived from an unroasted seed or grain (e.g., oats) can increase shelf life and decrease stickiness.

An oat butter provided herein can be stored frozen, in refrigerated conditions, or at room temperature. In some embodiments, an oat butter provided herein can have a shelf life of at least 3 months (e.g., at least 6 months, or at least 9 months) at room temperature.

In some embodiments, a food product that contains an ingredient derived from roasted oats provided herein can be peanut-free. As used herein, the term "peanut-free" refers to an ingredient or food that does not contain peanuts or ingredients derived from peanuts. Preferably, a peanut-free ingredient or food contains no detectable peanut allergens.

A food product provided herein can be any food, including human food or animal feed.

The following examples describe particular embodiments of roasted oats provided herein, methods of making roasted oats, and compositions comprising roasted oats.

EXAMPLES

FIGS. 1-4 show examples of CIELAB L*-value change, CIELAB a*-value change, and CIELAB b*-value change over roasting time. In each example, peanut butter flavor was assessed by collecting 100 g samples of the oats, allowing them to cool to room temperature, and assessing aroma changes by smelling each sample. Each roasted oat sample was also chewed in the mouth and swallowed to further assess taste and aroma changes.

For FIG. 1, organic *Avena nuda* oats were soaked in water at room temperature for 30 minutes, drained of excess water, then steamed for 30 minutes at 11 psi. Steamed groats were then roasted at 350° F. in a conventional electric oven. Slopes of L*-value change per minute and b*-value change per minute turned negative at about 55 minutes, which correlated to development of peanut butter flavor.

Figure 2:
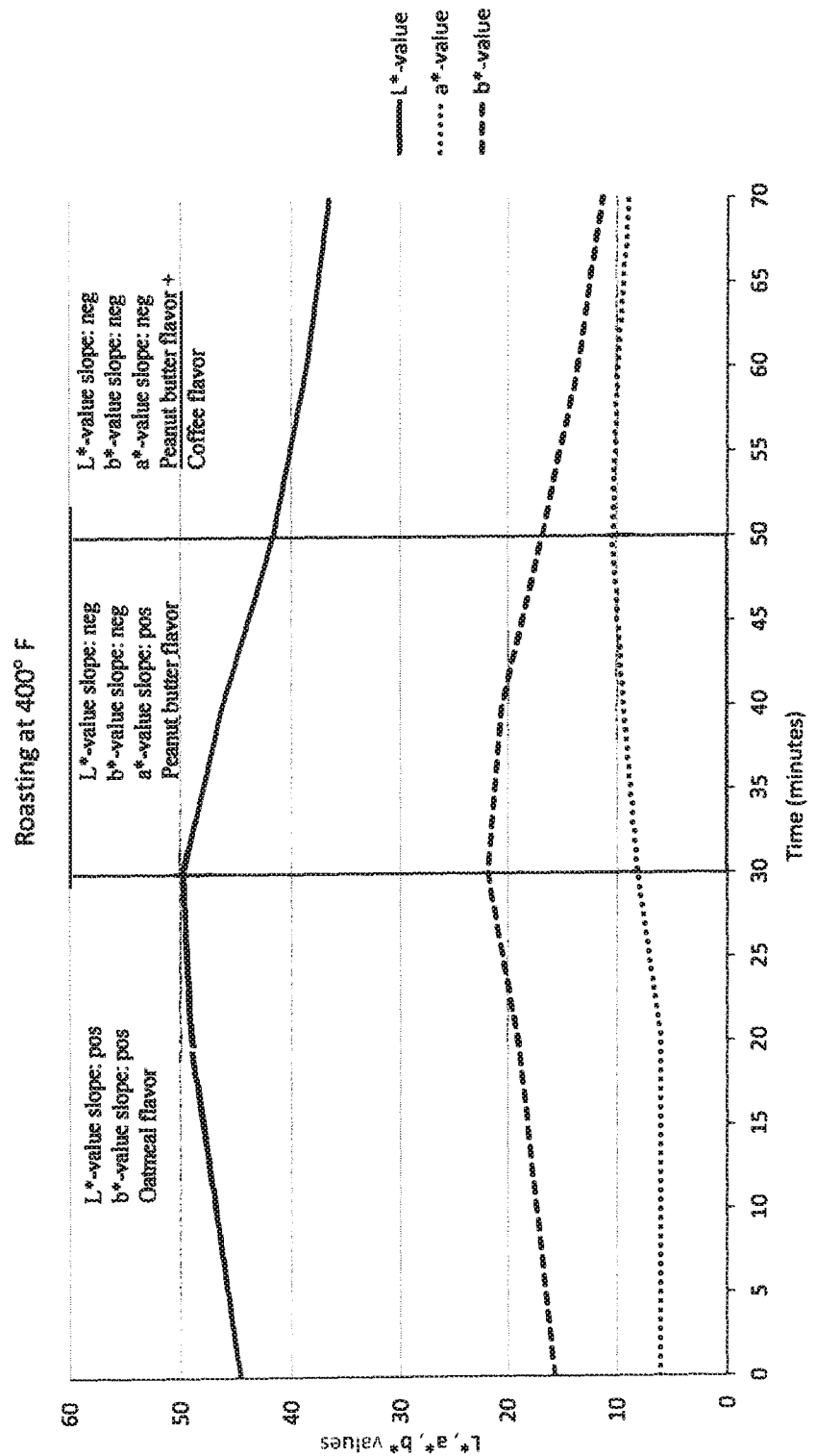
FIG. 2 shows a graph of an example of CIELAB L*-value change, CIELAB b*-value change, and CIELAB a*-value change over time during roasting of oats at 400° F.

For FIG. 2, organic *Avena nuda* oats were soaked in water at room temperature for 30 minutes, then steamed for 30 minutes at 11 psi. Steamed oats were then roasted at 400° F. in a conventional electric oven. Slopes of L*-value change per minute and b*-value change per minute turned negative at about 30 minutes, which correlated to development of peanut butter flavor. Slope in CIELAB a*-value change per minute turned negative at about 50 minutes, after which development of coffee notes was detected in addition to peanut butter flavor.

Figure 3:
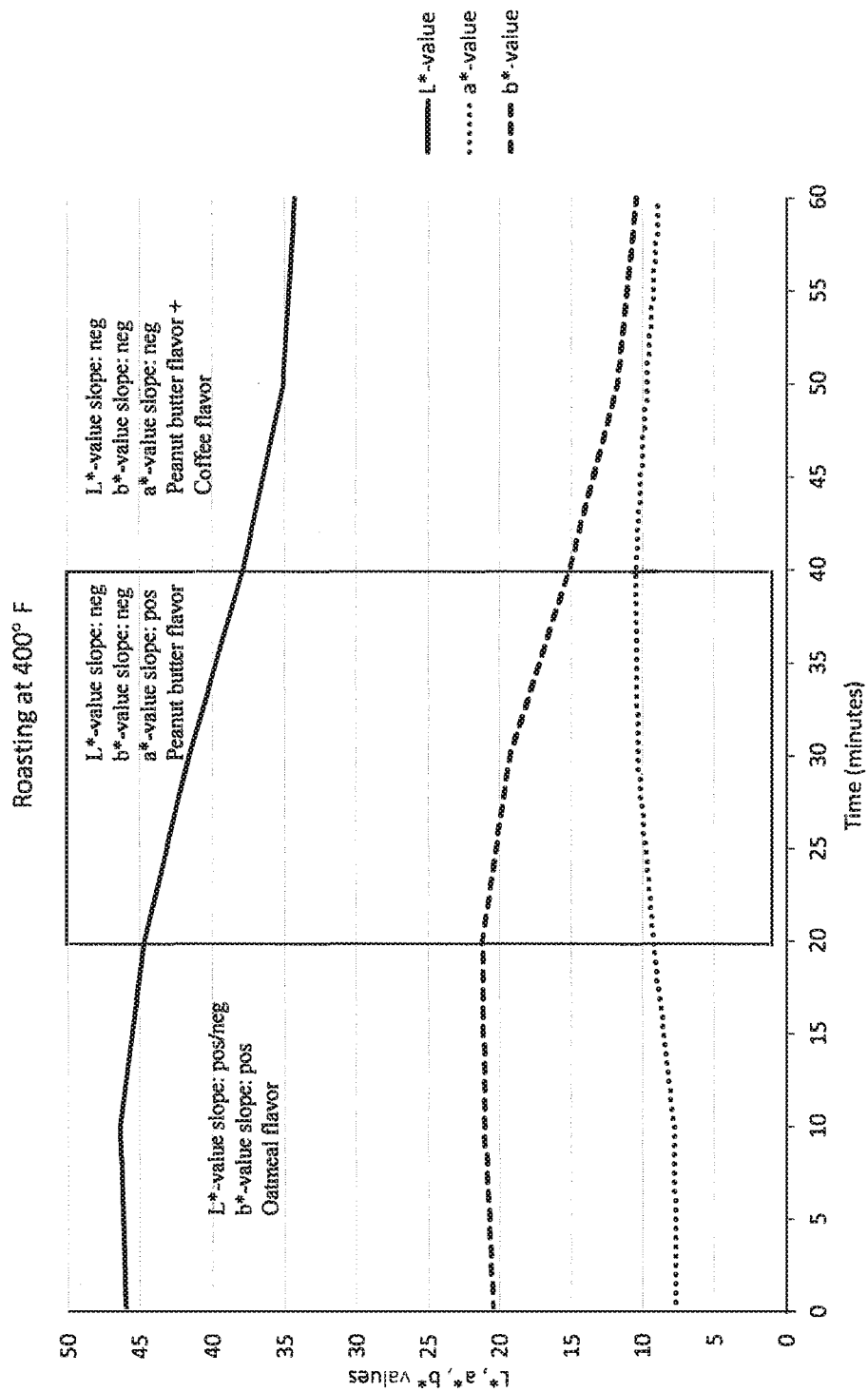
FIG. 3 shows a graph of another example of CIELAB L*-value change, CIELAB b*-value change, and CIELAB a*-value change over time during roasting of oats at 400° F.

For FIG. 3, *Avena sativa* oats were steamed for 50 minutes at 23 psi in a commercial batch cooker, dried at 250° F. for 38 minutes in a tray dryer, stored frozen for 6 months, then roasted at 400° F. in a conventional electric oven. Slopes for L*-value change per minute and b*-value change per minute turned negative at about 20 minutes, which correlated to development of peanut butter flavor. Slope for CIELAB a*-value change per minute turned negative at about 40 minutes, after which development of coffee notes was detected in addition to peanut butter flavor.

For FIG. 4, organic *Avena nuda* oats were soaked in water at room temperature for 30 minutes, drained of excess water, then steamed for 30 minutes at 11 psi. Steamed oats were then roasted at 500° F. in a conventional electric oven. Slopes for L*-value change per minute and b*-value change per minute turned negative at about 20 minutes, which correlated to development of peanut butter flavor. Slope for CIELAB a*-value change per minute turned negative at about 25 minutes, after which development of coffee notes was detected in addition to peanut butter flavor.

In another example (not pictured), organic *Avena nuda* oats were roasted, without prior steaming, at 400° F. in a conventional electric oven. Slopes for L*-value change per minute and b*-value change per minute turned negative at about 20 minutes, which correlated to development of peanut butter flavor. Slope for CIELAB a*-value change per minute turned negative at about 30 minutes, after which development of coffee notes was detected in addition to peanut butter flavor.

Lipase activity was measured in flour made from roasted oats for each of the above-described examples. Lipase activity was measured using Oatcheck I. Briefly, 0.1 g samples of flour from each roasted oat were placed into small plastic cups. Reagent A was prepared by mixing Color Reagent to Assay Buffer in a 1:10 ratio. Each sample was moistened with 8 drops of Reagent A and allowed to react for 30 minutes in the dark. Presence of a blue color after 30 minutes indicated lipase activity. Prior to steaming, each of the samples from FIGS. 1-4 showed lipase activity. Lipase activity was undetectable after steaming. In the sample that was not steamed, lipase activity was detectable until 40 minutes after starting roasting at 400° F.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of producing roasted oats, the method comprising roasting a plurality of substantially intact groats at a temperature of at least 350° F. to about 600° F. for a time of at least 10 minutes to achieve a negative slope in CIELAB L*-value change per minute, and a negative slope in CIELAB b*-value change minute, where slopes for L*-value change per minute and b*-value change per minute are based on CIELAB measurements at intervals of 5 minutes.

2. The method of claim 1, wherein the substantially intact groats are roasted for at least 15 minutes.

3. The method of claim 1, wherein CIELAB a*-value change per minute has a positive slope based on CIELAB measurements at intervals of 5 minutes.

4. The method of claim 1, further comprising a step of inactivating lipase activity in the plurality of substantially intact groats prior to roasting.

5. The method of claim 4, wherein the inactivating step includes exposing the plurality of substantially intact groats to steam for sufficient time to inactivate lipase activity.

6. The method of claim 4, wherein inactivating step includes soaking the plurality of substantially intact groats in water or an aqueous solution at a temperature and pressure sufficient to inactivate lipase activity.

7. The method of claim 4, further comprising a step of drying the plurality of substantially intact groats to a moisture content of less than 15% after the inactivation step and prior to roasting.

8. The method of claim 7, further comprising storing the plurality of substantially intact groats following the drying step and prior to roasting.

9. The method of claim 1, wherein the roasted oats have a moisture content of 6% or less.

10. The method of claim 9, wherein the roasted oats have a moisture content of 1% or less.

* * * * *